R. L. WILCOX.
METHOD AND DIE FOR TRIMMING BLANKS.
APPLICATION FILED FEB. 26, 1918.
1,294,988.
Patented Feb. 18, 1919.
2 SHEETS—SHEET 1.
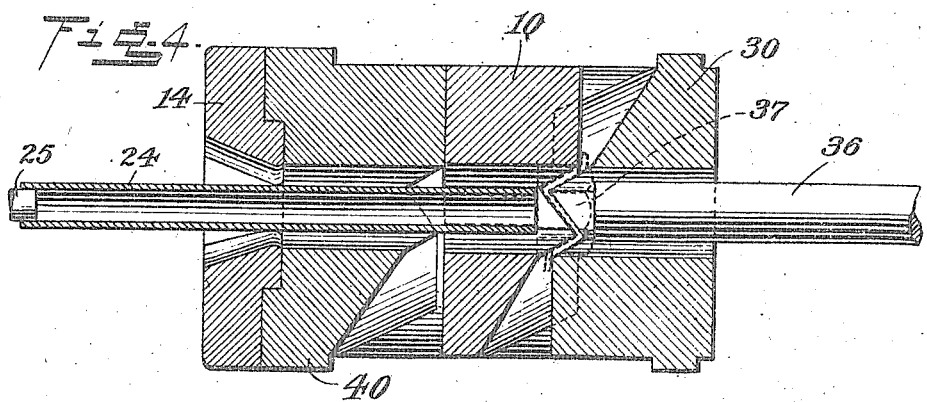
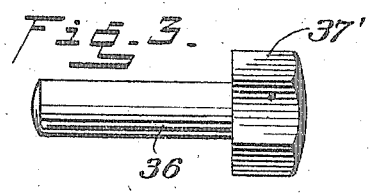
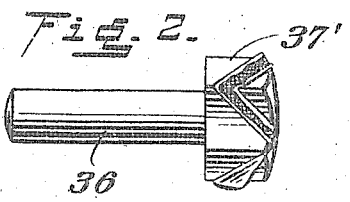
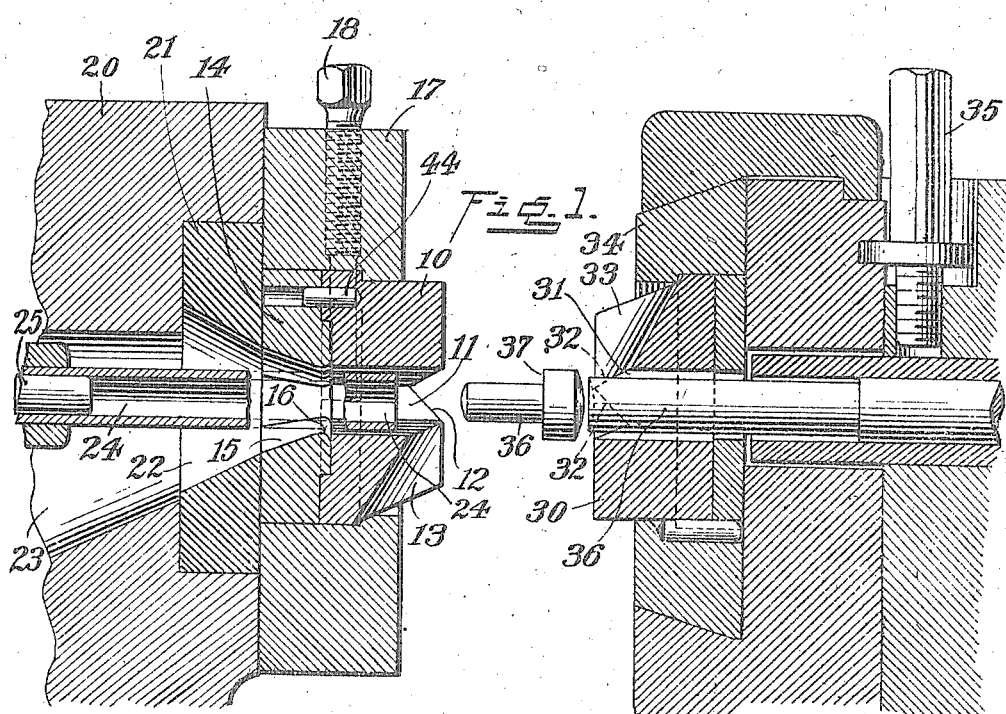
INVENTOR.
RICHARD LESTER WILCOX.
by George E. Hall
Atty.

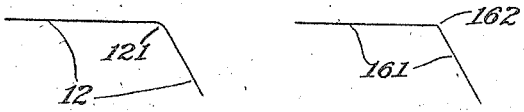
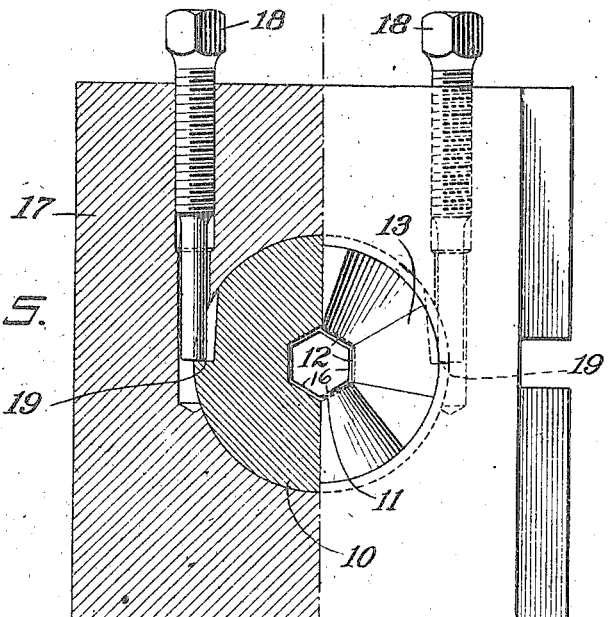
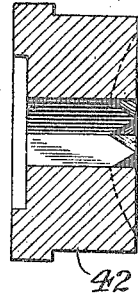
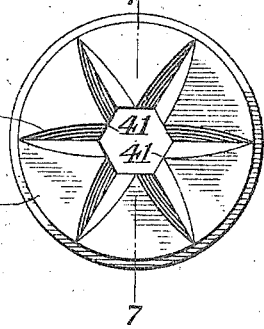
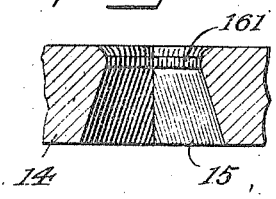
INVENTOR
RICHARD LESTER WILCOX.
BY
ATTORNEY

UNITED STATES PATENT OFFICE.

RICHARD LESTER WILCOX, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

METHOD AND DIE FOR TRIMMING BLANKS.

1,294,988.  Specification of Letters Patent.  Patented Feb. 18, 1919.

Application filed February 26, 1918. Serial No. 219,170.

*To all whom it may concern:*

Be it known that I, RICHARD LESTER WILCOX, a citizen of the United States, and a resident of Waterbury, county of New Haven, State of Connecticut, have invented certain new and useful Improvements in Methods and Dies for Trimming Blanks, of which the following is a specification.

My invention relates more especially to methods and dies by which a blank can be given a polygonal cross section, such as the square, hexagonal or octagonal shapes of bolt heads, nuts and the like, or a many-sided shape of any kind, such for instance, as a circular section, with flat sides, as is formed on shackle bolts and the like. It will be understood that by "polygonal" or "polygon" I mean any such shape. A blank may also be cut so as to have a circular section, and when I refer hereinafter to a "trimmed" section, it will be understood that I mean a section of any shape which has been cut or trimmed by the dies, either entirely around it or on any particular portion.

One of the objects of my invention, among others, is to give a trimmed cross section to a blank with an entire cutting of the metal and without tearing it and at the same time with a minimum amount of cutting pressure. A desirable advantage resulting therefrom is the production of a clean, unbroken cut surface on the blank.

As the trimming of bolt heads, nuts and the like has heretofore usually been carried out, the blank is passed through a die having a suitably shaped opening therein, in such a way that the cutting edges of the die enter the blank by cutting for a short distance and then, the resistance to the cutting pressure having been sufficiently decreased, the remaining metal is practically torn from the blank, leaving the faces of the blank rough and in most cases, with depressions below what should be the level of the face. For some classes of work, the bolts or nuts thus formed are undesirable because of their unsightly and unfinished appearance.

I have found that trimmed blanks with a very superior finish may be produced with a relatively small cutting pressure if the metal of the blank is cut away from each end preferably until only a small portion of the uncut metal remains, and then cutting away this uncut portion and subsequently planishing the surface, if desired. I have also found that the best results are obtained if the cutting from opposite ends of the blank takes place simultaneously around the entire blank with cuts arranged so that the chips from opposing cuts from opposite ends of the blanks are rolled toward each other. While my general method may be carried out in many different ways, I have illustrated certain forms of dies which I have found convenient for that purpose.

In the drawings, Figure 1 represents in section a pair of cutting dies arranged to carry out my novel method, together with supports for such dies and punches by which the operations of the method may be facilitated;

Fig. 2 represents a blank (in this instance a blank for a hexagon headed bolt) which has been partly completed; and Fig. 3, the blank of Fig. 2 after it has been completed;

Fig. 4 is a section illustrating a further step in my novel method, together with an additional cutting step which may be used if desired;

Fig. 5 is a partial front elevation and partial section of the die and its holder, illustrated at the left of Fig. 1; and Fig. 6 is the front elevation of another form of die which may be used in carrying out the method herein described; and Fig. 7 is a cross section on the line 7—7 of Fig. 6;

Figs. 8 and 9 illustrate on an enlarged scale an arrangement of cutting edges and planishing surfaces; and Fig. 10 is an enlarged cross section through one form of planishing die.

The corresponding parts are referred to both in the drawings and specification by similar reference characters.

In the drawings, 10 represents an illustrative form of die having an opening 11 (hexagonal in this instance) therethrough and provided with cutting edges 12 formed by angular cuts 13 through the sides of the die, preferably in such a manner as to form the cutting edges 12 so that each pair of such edges will have opposed angular relation to the direction of motion of a blank passing through the die, or, in other terms, having opposed angular relation to the axis of the die. Behind the die 10 is a planishing device 14 having an opening 15 and a series of projections 16 around its upper edge adjacent the die 10, these projections being, in the form illustrated in Fig. 1, curved in cross section with their innermost lines forming rubbing surfaces parallel with the sides of the die-opening 11 (as shown at 16 in Fig. 5), but slightly nearer the axis of the die.

The die 10 and planishing member 14 are held in a die holder 17 preferably provided with a pair of adjusting screws 18, 18 engaging with shoulders 19, 19 on the die 10 so that the die 10 may be rotated in the holder 17.

The holder 17 is connected to a support 20 into which is set a backing plate or member 21 having an opening 22 in continuation of the opening 15 of the planishing device 14. The support 20 is also provided with an opening 23 in continuation of the openings 22 and 15. Movable within the openings 23, 22, 15 and 11 (by means not shown) is a bushing 24 having a stripper rod 25 located therein. The die 10 and planishing device are held in proper relation to each other by a dowel pin 44.

At the right of Fig. 1 is an illustrative form of die 30 similar in many respects to the die 10. It is provided with an opening 31 and cutting edges 32 formed by angular cuts 33 so as to produce cutting edges angularly disposed to the line of travel of a blank passing into the die, or to the axis of the die. The cutting edges 32 and 12 are preferably parallel. Both of the openings 11 and 31 are given a slight taper to provide proper clearance for the cutting edges 12 and 32 respectively. Because of the angular relation of the cutting edges to the axes of the dies, the opening is shaped so that each part of each cutting edge is the correct distance from the axis of the die to form the desired size on the blank, regardless of the distance of that part of the cutting edge below the surface of the die.

The die 30 is held in a holder 34 which may be adjusted laterally by any suitable means, and also up and down by the adjusting screw 35. Movable in the opening 31 is a punch 36.

In carrying out my operation which will be described hereinafter, it is desirable that the dies 10 and 30 shall be alined so that the axes of the openings 11 and 31 shall coincide and so that the cutting edges 32 and 12 shall lie substantially in the same plane. The vertical and horizontal adjustments provided for the die 30 and the rotary adjustment of the die 10 enables this condition to be brought about.

In carrying out my preferred method, a blank, as 36, having a head 37 is placed between the two dies and the latter are moved together. In the form illustrated it will be assumed that the die at the right of Fig. 1 is moved toward the die 10. This will carry the shank of the blank 36 into the opening 11 and into the opening in the bushing 24 which at this time is in a position wherein the free end thereof is adjacent to the front face of the die 10. When the dies 10 and 30 are in such relative positions that each is in contact with the bottom and top of the head 37 respectively, the punch 36 will have been moved backward to the right of Fig. 1. Continued motion of the dies together or of one die toward the other will cause each set of cutting edges 12 and 32 to cut into the metal of the head 37 and when the dies are in the relative positions shown in Fig. 4, all of the metal will have been cut from the faces except a small portion, as illustrated in Figs. 2 and 4. In making these cuts, the chip from each cutting edge will be forced toward its opposing cutting edge and there will be no breaking down of the resistance in the material which would cause a tearing of the metal.

Preferably the next step in my method consists of completing the cutting operation by forcing the blank through one of the dies after stopping the cutting from the opposite die. This may be done by bringing the punch 36 forward or toward the left of Fig. 1 to engage the blank and continue it on its direction through the opening 11. This will shear off the remaining small portion of the metal. I have found it desirable just before this step, to move the dies slightly apart to remove the pressure against the two sides of the metal remaining on the blank, but this step is not essential.

It will be understood that the bushing 24 is moved backward so as to permit the blank to progress through the die 10.

If it is desired to give a high finish to the polygonal surfaces, this may be done in the same operation by providing the planishing device 14. The projections 16 of the planishing device are only slightly nearer the center of the blank than are the cutting edges 12 and by forcing the blank through these projections, the freshly cut surfaces are ironed or smoothed out and polished.

The blank and the bushing 24 supporting it move to the left of Fig. 1 until the blank contacts with the stripper pin 25. Further motion of the bushing 24 will act to eject the blank from the bushing and cause it to drop through the opening 23 out of the machine. It will be understood, however, that if desired, the planishing operation may be omitted and also that the blank may be returned to the right of Fig. 1 through the die 10 and dropped out on that side of the die.

I have also found it preferable, in some cases to form the opening 31 slightly larger than the opening 11. This has the effect of leaving a slight amount of metal on the faces as cut by the die 30 and this slight amount of metal is trimmed off as the blank is carried through the die 10 after the die 30 has stopped cutting.

Fig. 4 shows an arrangement which is essentially the same as the arrangement shown in Fig. 1, except that there is interposed between the die 10 and the planishing device 14 a supplemental cutter 40 which will usually have cutting edges formed on it similar to the cutting edges of the die 10 but somewhat nearer the center of the blank so that, as the blank is forced past these supplementary cutting edges, an additional light shaving is taken off each face to size the head more accurately. If desirable this cutter 40 may have cutting edges to produce other shapes to the blank as formed by the edges 12 and for instance, an edge to form a groove in one of the faces for use with a nut locking device or the like.

In Fig. 6 is another illustrative form of die which may be used instead of the dies 10 and 30. As illustrated, the angular cutting edges 41 are produced in a solid die 42 by angular cuts 43 into the face of the die so as to produce a pair of cutting edges for each face of the opening with one end of each edge in the surface of the die at the middle of one of the sides of the polygon. It will be understood that the opposing die is similarly formed so that, when these dies are brought together, the metal is cut with a V-shape chip on each face. The remaining operation for completing the head will be the same as that which I have just described.

If desired, the cutting edges in the form illustrated in Fig. 6 may be formed by making the cuts 43 so that the middle of the cut comes between the ends of the faces instead of at the ends as shown in Fig. 6.

While I have shown in Fig. 1 parts which obviously may be mounted in any suitable machine so that my method may be carried out automatically, it will be clear that the same results may be accomplished by any suitable tools by which the dies may be brought together and the blank pushed through the dies, in accordance with the method which I have described.

Preferably I form all cutting edges of each die so that each adjacent pair forms opposing angles with the direction of travel of the blank, but it will be understood that such an arrangement is not essential. Since practically all of the metal is removed simultaneously from each end of the blank by opposing cuts, it will be obvious that these opposing cuts on each face balance each other so far as any tendency to rotate the blank is concerned, and that, therefore, it is immaterial what is the relation between the cutting operations on adjacent faces so far as prevention of rotation of the blank is concerned.

While I find it preferable in carrying out my method to stop the cutting from opposite ends before the cutters have entirely removed all the metal, it will be obvious that, if the cutters are properly shaped and the method carried out with great exactness, the cutters could be brought together so as to remove completely all of the metal by simultaneously cutting from opposite ends. Since these conditions are not readily obtainable, however, and since the provision of proper clearances for the chip will tend to weaken the cutting edges, I prefer to stop the cutting from the opposite ends before the cutters meet, as I have previously described.

It is obvious that the operation of forming the trimmed blank will be carried out more quickly if all of the faces are cut simultaneously. It will be understood, however, that this is not essential, since the faces could be cut one at a time, the pressure of the opposing cutters for each face supporting each other and preventing any sudden breaking away of the metal to tear the surface.

While I find it preferable to cut each face simultaneously from opposite ends, many of the beneficial results of my novel method may be obtained even if each face is cut first in one direction and then in the opposite direction. Although this will not give the opposing cutters the support which is obtained when simultaneous cutting takes place, nevertheless it will cause the last metal to be removed from a portion of the face between the ends. More serious tearing of the metal occurs when the cut is carried to the end of a surface than occurs if the cutting is completed somewhere between the ends.

I have shown the planishing device in Fig. 1 at some distance from the cutting edges 12, but it will be understood that such device could be brought directly behind the edges 12, as for instance, by projections on the walls of the opening 11.

I have found it advantageous, when using a planishing device in connection with my novel dies when cutting polygonal shapes, to slightly round the apex of the angles formed by the adjacent cutting edges. The polygonal shape cut with such a die will not have the edge between adjacent faces sharply defined, but such edges will be slightly rounded. Then when the blank is passed through the planishing device in which no such rounding occurs, the metal of the blank as it is smoothed or ironed out, will flow into the sharp angle between adjacent surfaces of the device and this will leave a sharp edge between the trimmed faces on the blank. In Figs. 8 and 9, I have illustrated on a large scale, one form of rounding 121 between the cutting edges 12 of die 10 and the sharp angle 162 between the planishing surfaces of the planishing die 14. In Fig. 10 I have illustrated on a large scale, a preferred shape when a solid planishing surface is used. A narrow flat surface 161 is formed to do the actual planishing, and the die is cut away in curves on both sides of the surface 161.

I claim:—

1. The method of giving a trimmed cross-section to a blank, consisting of cutting the blank from opposite ends thereof a distance sufficient to leave a portion of uncut metal on the blank between the ends thereof, the line of each cut making an acute angle with the direction of cutting, and then cutting away the uncut portion.

2. The method of giving a trimmed cross-section to a blank, consisting of cutting the blank from opposite ends thereof a distance sufficient to leave a portion of uncut metal on the blank between the ends thereof, the line of each cut making an acute angle with the direction of cutting, and being substantially parallel with the line of a cut from the opposite end of the blank, and then cutting away the uncut portion.

3. The method of giving a trimmed cross section to a blank, consisting of cutting the blank from opposite ends thereof a distance sufficient to leave a portion of uncut metal on the blank between the ends thereof, the cuts from one end being deeper than those from the opposite end, and continuing the deeper cut to the end of the blank.

4. The method of giving a trimmed cross section to a blank, consisting of cutting the blank from opposite ends thereof a distance sufficient to leave a portion of uncut metal on the blank between the ends thereof, the cuts from one end being deeper than those from the opposite end and continuing the deeper cut to the end of the blank, and then taking a thin cut over each face.

5. The method of giving a trimmed cross section to a blank, consisting of cutting from opposite ends of the blank, with cuts having cutting lines making angles with the direction of cutting and with the cutting lines of the opposing cuts substantially parallel.

6. The method of giving a trimmed cross section to a blank, consisting of cutting the blank so as to leave rounded surfaces connecting adjacent cut faces of the blank and then planishing the cut surfaces so as to cause the material thereof to flow so as to smooth the surfaces and to form sharp lines of division between adjacent faces.

7. A first die having an opening therein with a series of cutting edges around its periphery, each cutting edge making an angle with the axis of the opening, a second die having an opening therein with a series of cutting edges around its periphery, each cutting edge making an angle with the axis of the opening, the dies being positioned relatively to each other so that the cutting edges of the pair of dies are toward each other with the openings in alinement.

8. A first die having an opening therein with a series of cutting edges around its periphery, each cutting edge making an angle with the axis of the opening, a second die having an opening therein with a series of cutting edges around its periphery, each of the cutting edges forming an angle with the axis of the opening, the dies being constructed and arranged and positioned relatively so that the openings are in alinement with each other with the cutting edges of the pair of dies toward each other and with the cutting edges of the second die substantially parallel with the opposing cutting edges of the first die.

9. A first die having an opening therein with a series of cutting edges around its periphery, each cutting edge making an angle with the axis of the opening, a second die having an opening therein with a series of cutting edges around its periphery, each of the cutting edges of the second die forming an angle with the axis of the opening, the cutting edges of one of said dies being slightly nearer the axis of the openings than the opposing cutting edges of the other of said dies and the openings being in alinement.

10. A first die having an opening therein with a series of cutting edges around its periphery, each cutting edge making an angle with the axis of the opening, a second die having an opening therein with a series of cutting edges around its periphery, each of the cutting edges forming an angle with the axis of the opening, the dies being constructed and arranged and positioned relatively so that the openings are in alinement with each other with the cutting edges of the pair of dies toward each other, and a planishing device adjacent the cutting edges of one of the dies, constructed and arranged to planish the surfaces produced by the cutting edges of the dies.

11. A first die having an opening therein with a series of cutting edges around its periphery, each cutting edge making an angle with the axis of the opening, and some of the adjoining cutting edges forming angles with each other, a second die having an opening therein with a series of cutting edges around its periphery, each of the cutting edges forming an angle with the axis of the opening, the dies being constructed and arranged and positioned relatively so that the openings are in alinement with each other with the cutting edges of the pair of dies toward each other.

12. A first die having an opening therein with a series of cutting edges around its periphery, each cutting edge making an angle with the axis of the opening, a second die having an opening therein with a series of cutting edges around its periphery, each of the cutting edges forming an angle with the axis of the opening, the dies being constructed and arranged and positioned relatively so that the openings are in alinement with each other with the cutting edges of the pair of dies toward each other, a third die having an opening in alinement with the openings in the first and second dies and adjacent the end of one of the dies and provided with cutting edges arranged to cut the blank after the blank has been cut by the first and second dies.

13. A first die having an opening therein with a series of cutting edges around its periphery, each cutting edge making an angle with the axis of the opening, a second die having an opening therein with a series of cutting edges around its periphery, each of the cutting edges forming an angle with the axis of the opening, the dies being constructed and arranged and positioned relatively so that the openings are in alinement with each other with the cutting edges of the pair of dies toward each other, a third die having an opening in alinement with the first and second dies and adjacent the end of one of the dies and provided with cutting edges arranged to take a cut over the surfaces produced by the cutting edges of the first and second dies, and a planishing device adjacent the end of the third die away from the cutting edges, constructed and arranged to planish the surfaces produced by the cutting edges.

14. A pair of similar solid dies each having a flat face and a polygonal opening therein, and a series of cutting edges formed on the edges of the opening, each of the cutting edges making an angle with the face of the die and each cutting edge forming one boundary of a surface below the face of the die, the surface being angularly disposed to the face of the die, the dies being arranged with a common axis with their similar cutting edges and the surfaces containing them parallel and facing each other.

15. A die having a polygonal opening therein with a series of cutting edges around its periphery, each cutting edge making an angle with the axis of the opening and each cutting edge having a small curve at either end joining each adjacent cutting edge and a planishing device adjacent the die and having planishing surfaces arranged to smooth out and iron each of the faces of a blank cut by the cutting edges of the die, each planishing surface meeting each adjacent planishing surface at a sharp angle.

16. A die having a plurality of cutting edges arranged around an axis to form a polygon with a small cutting curve between the ends of each adjacent pair of cutting edges and a planishing device adjacent the die and having planishing surfaces arranged to smooth out and iron each of the faces of a blank cut by the cutting edges of the die, each planishing surface meeting each adjacent planishing surface at a sharp angle.

17. A die having a plurality of cutting edges arranged to cut a polygonal cross section on a blank passed through the die and a planishing device adjacent the die and in alinement therewith and constructed and arranged to smooth and iron the faces on the blank cut by the cutting edges.

18. A die having a plurality of cutting edges arranged to cut a polygonal cross section on a blank passed through the die and a planishing device adjacent the die and having an opening therein with planishing surfaces around the opening, each parallel to one of the sides of the polygonal opening through the die and constructed and arranged to smooth and iron the surface of the blank cut by that edge.

19. A die having a plurality of cutting edges arranged to cut a polygonal cross section on a blank, with adjacent faces of the blank connected by a curved surface of small radius, and a planishing device adjacent the die and in alinement therewith and having planishing surfaces constructed and arranged to smooth and iron the surfaces of the blank and to force the metal thereof to flow to form sharp lines of division between the faces.

20. A pair of dies each having an opening therethrough with cutting edges forming the periphery of one end of each of the openings, and the dies being positioned with the base of the first die against the top of the second die and with the openings in alinement and with each cutting edge of the first die in substantially the same plane with a cutting edge of the second die, the second die having sloping recesses in its top surface extending from its cutting edges to the exterior of the dies.

RICHARD LESTER WILCOX.